(12) United States Patent
Cultraro

(10) Patent No.: US 8,857,579 B2
(45) Date of Patent: Oct. 14, 2014

(54) LINEAR SHOCK ABSORBER

(75) Inventor: Antonino Cultraro, Rivoli (IT)

(73) Assignee: Cultraro Automazione Engineering S.R.L. (IT)

( * ) Notice: Subject to any disclaimer, the term of this patent is extended or adjusted under 35 U.S.C. 154(b) by 265 days.

(21) Appl. No.: 13/500,299

(22) PCT Filed: Oct. 13, 2010

(86) PCT No.: PCT/IB2010/054632
§ 371 (c)(1),
(2), (4) Date: Apr. 4, 2012

(87) PCT Pub. No.: WO2011/045754
PCT Pub. Date: Apr. 21, 2011

(65) Prior Publication Data
US 2012/0205208 A1    Aug. 16, 2012

(30) Foreign Application Priority Data

Oct. 14, 2009   (IT) .............................. TO2009A0780
May 31, 2010    (IT) .............................. TO2010A0456

(51) Int. Cl.
*F16F 9/48*    (2006.01)
*F16F 9/36*    (2006.01)
*F16F 1/37*    (2006.01)
*F16F 9/512*   (2006.01)
*F16F 9/34*    (2006.01)
*F16F 9/516*   (2006.01)
*F16F 9/00*    (2006.01)

(52) U.S. Cl.
CPC ............... *F16F 9/3405* (2013.01); *F16F 9/368* (2013.01); *F16F 1/37* (2013.01); *F16F 9/5126* (2013.01); *F16F 9/5165* (2013.01); *F16F 9/003* (2013.01)

USPC ................. 188/288; 188/322.15; 188/322.22

(58) Field of Classification Search
USPC ............ 188/288, 284, 286, 289, 315, 322.15, 188/322.19, 322.22; 267/64.22, 64.26
See application file for complete search history.

(56) References Cited

U.S. PATENT DOCUMENTS 3,171,643 A * 3/1965  Roos ........................... 267/64.15
6,591,948 B2 * 7/2003  Casellas et al. ........... 188/322.18

(Continued)

FOREIGN PATENT DOCUMENTS

DE    102004014395    11/2004    ................ F16F 9/34
DE    102008008268    8/2009     .............. F16F 9/508

(Continued)

*Primary Examiner* — Pamela Rodriguez
(74) *Attorney, Agent, or Firm* — Hayes Soloway P.C.

(57) ABSTRACT

A shock absorber comprises a tubular housing (10), a cover (14), and a piston (34) defining within the tubular housing (10) a working chamber (W) 34g 34h and an accumulator chamber (A). A first fluid pathway (34p, 42, 34g) and a second fluid pathway (46, T, 34f) arranged in parallel connect the working chamber (W) to the accumulator chamber (A). The first fluid pathway establishes a permanent fluid communication between the working chamber (W) and the accumulator chamber (A). A valve assembly comprises an obturating element (44) arranged around the piston (34) and slidable along an axial length of the piston (34). The second fluid pathway comprises a first pathway section (34f) formed through the piston and a second pathway section (46, T) formed between the piston (34) and the obturating element (44). The second fluid pathway is able to selectively assume an open configuration and a closed configuration, and it has a lower fluid resistance than the fluid resistance of the first fluid pathway.

16 Claims, 16 Drawing Sheets

(56) References Cited

U.S. PATENT DOCUMENTS

| | | | | |
|---|---|---|---|---|
| 6,619,445 | B2* | 9/2003 | Forster | 188/315 |
| 2002/0056368 | A1* | 5/2002 | May | 92/248 |
| 2004/0251099 | A1 | 12/2004 | Papp et al. | 188/322.15 |
| 2005/0045438 | A1* | 3/2005 | Keller et al. | 188/282.5 |
| 2006/0163016 | A1 | 7/2006 | Ferkany | 188/288 |
| 2013/0248307 | A1* | 9/2013 | Abreu et al. | 188/322.15 |

FOREIGN PATENT DOCUMENTS

| | | | |
|---|---|---|---|
| EP | 1508721 | 2/2005 | F16F 9/02 |
| EP | 2546443 | 1/2013 | E05F 3/14 |
| GB | 191316632 | 7/1913 | |
| GB | 918083 | 2/1963 | |
| GB | 2087510 | 5/1982 | F16F 9/34 |
| GB | 2277571 | 11/1994 | F16F 9/34 |
| JP | 2008151294 | 7/2008 | F16F 9/34 |

* cited by examiner

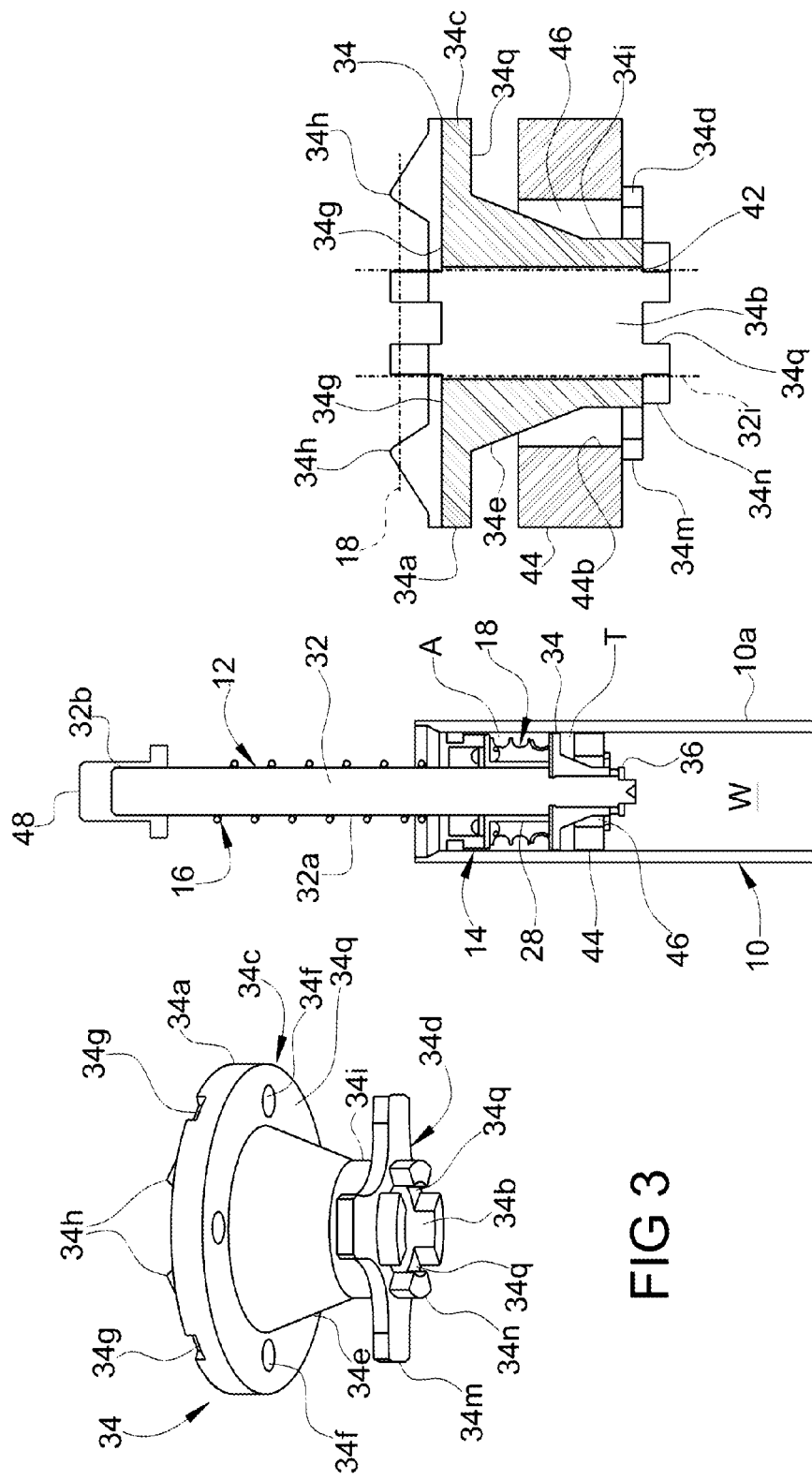

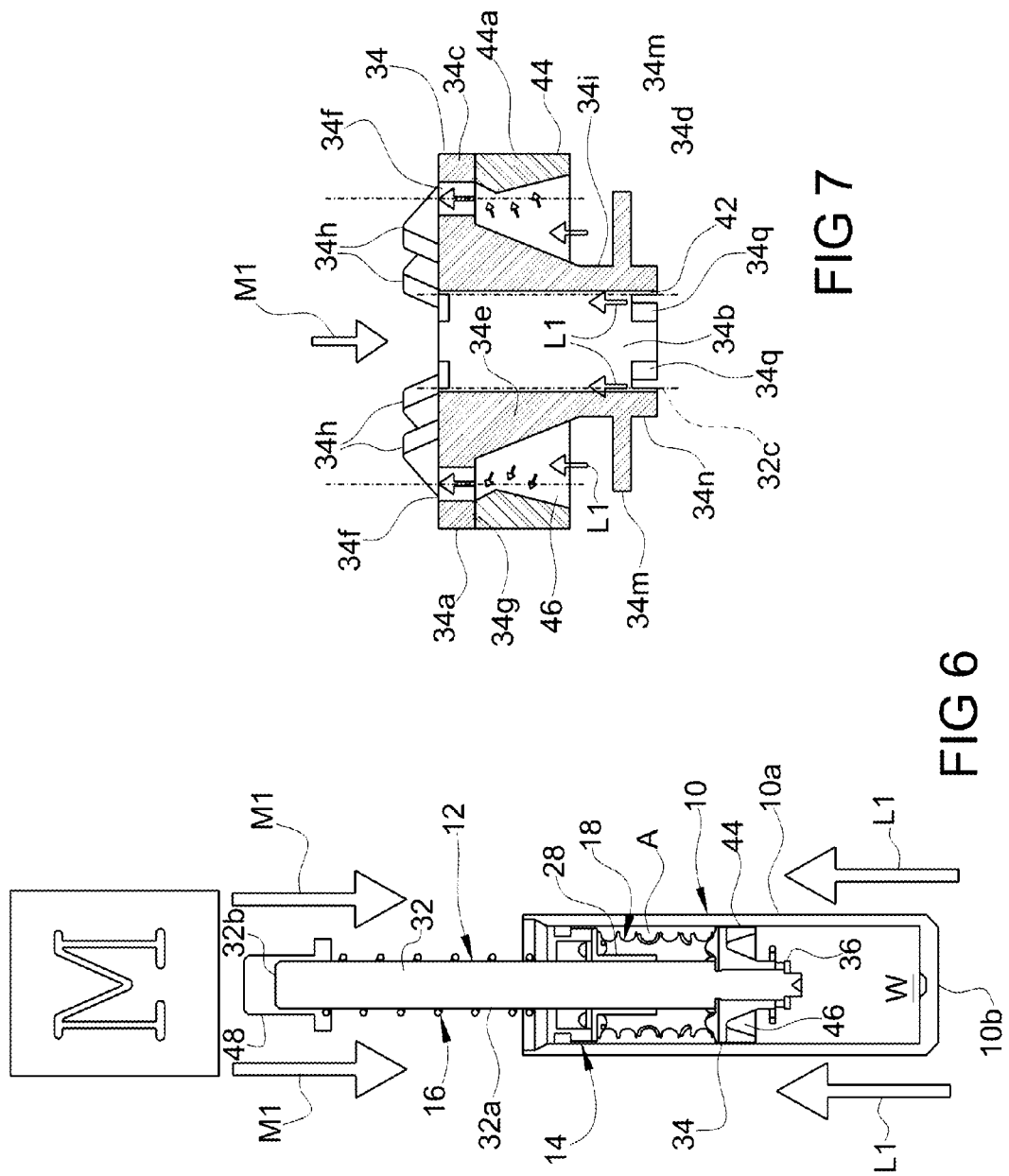

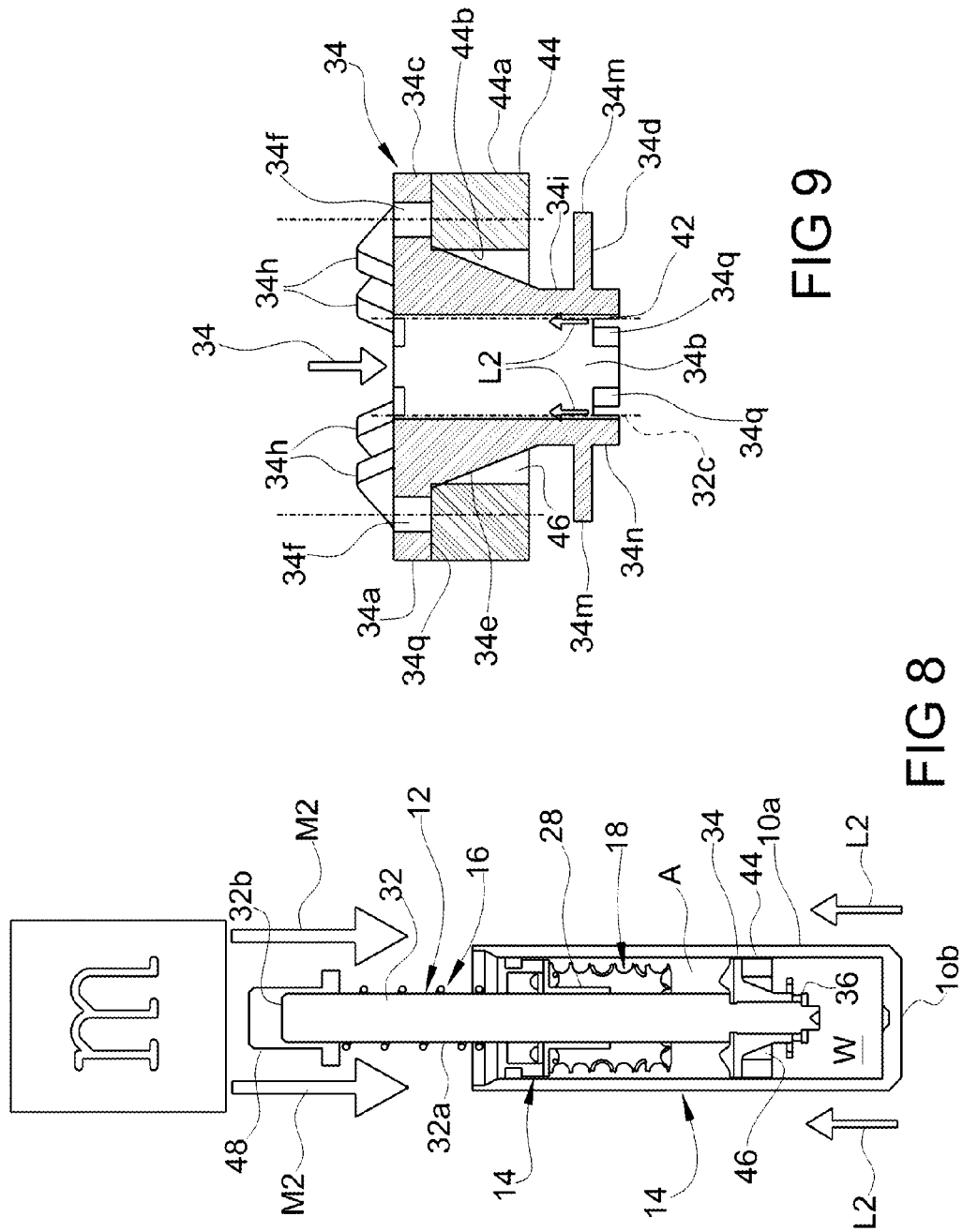

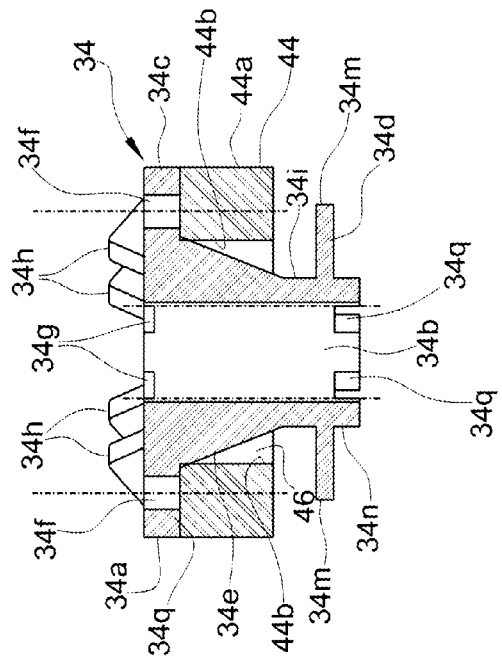
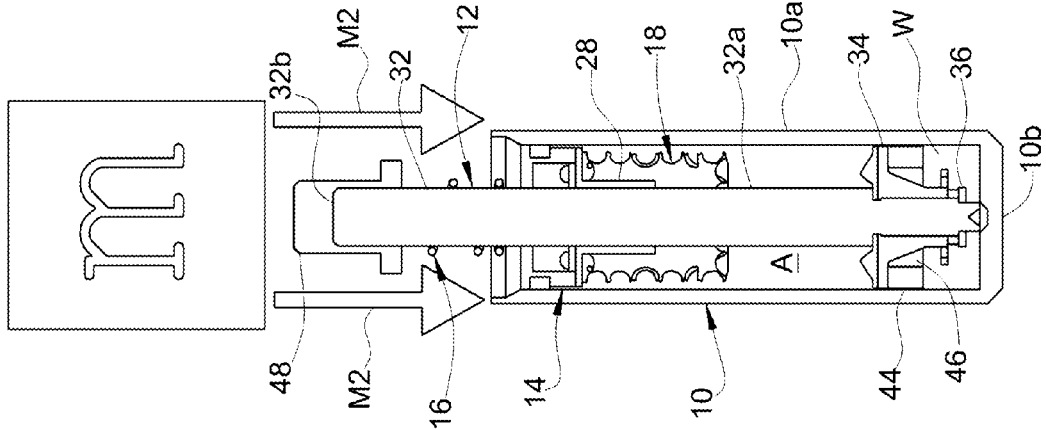
FIG 11
FIG 10

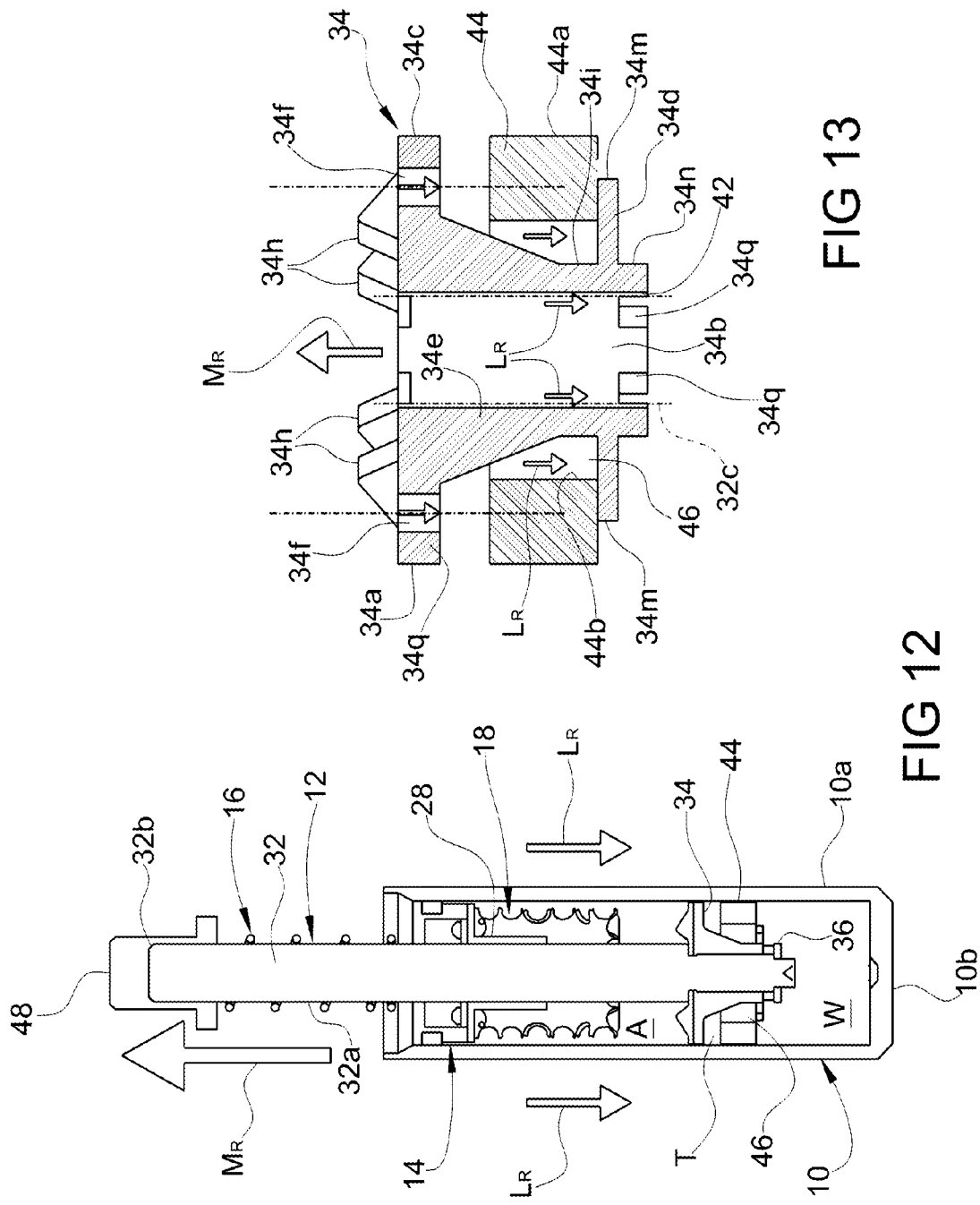

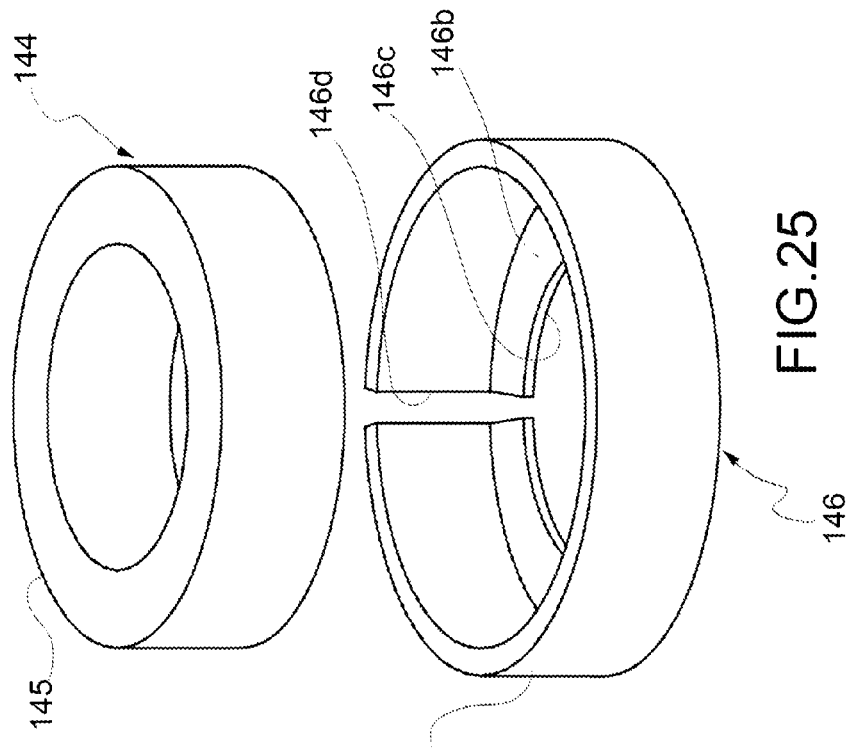
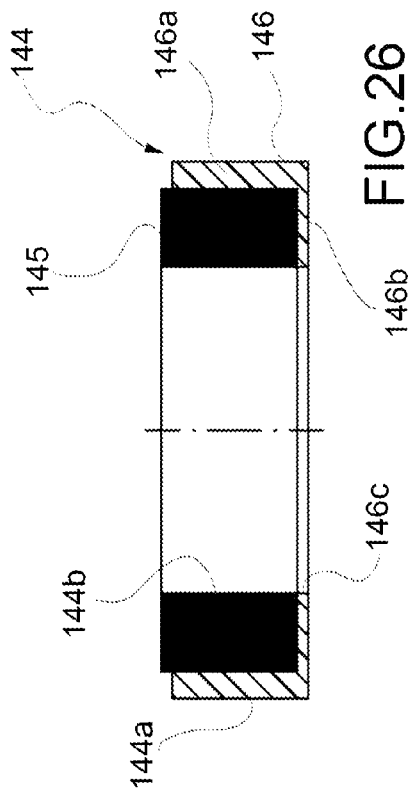
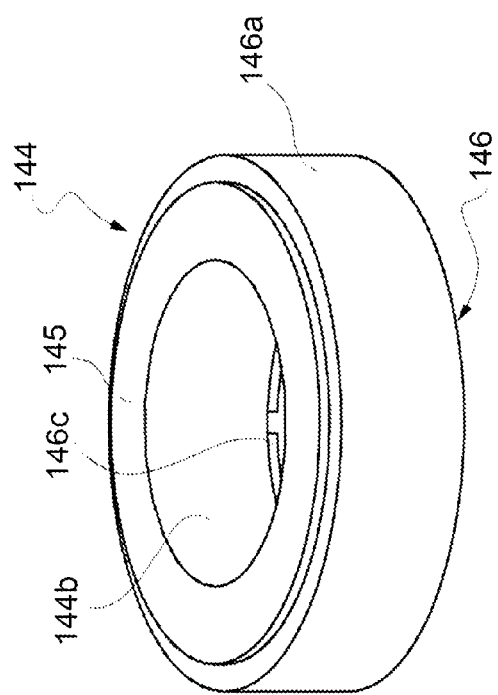

LINEAR SHOCK ABSORBER

BACKGROUND OF THE INVENTION

The present invention refers to a shock absorber, comprising:
- a tubular housing having a front end and a rear end;
- a bearing assembly sealingly mounted on the front end of the tubular housing;
- a piston assembly comprising a piston mounted for reciprocal sliding movement in the tubular housing, said piston defining within the tubular housing a working chamber and an accumulator chamber disposed on the rear side and on the front side of the piston, respectively, and a stem connected to the piston and extending out of the front end of the tubular housing through the bearing assembly;
- a first fluid pathway and a second fluid pathway parallel disposed for connecting the working chamber to the accumulator chamber, wherein said first fluid pathway establishes permanent fluid communication between the working chamber and the accumulator chamber; and
- valve means for selectively establishing fluid communication between the working chamber and the accumulator chamber.

Shock absorbers of this type are widely available, an example of which is known from US 2006/163016 A1.

SUMMARY OF THE INVENTION

The purpose of the present invention is to provide a shock absorber with compact dimensions, which can be made with a limited number of components.

Such a purpose is accomplished according to the invention by a shock absorber of the type defined at the beginning, in which
- said valve means comprise a ring-shaped obturating element arranged around the piston and slidable along an axial length of the piston; and
- said second fluid pathway comprises a first pathway section formed through said piston and a second pathway section formed between the piston and the obturating element so that said second fluid pathway is able to selectively assume an open configuration, in which said second fluid pathway establishes a fluid communication between the working chamber and the accumulator chamber, and a closed configuration, in which said second fluid pathway is blocked, said second fluid pathway having in the open configuration a lower fluid resistance than the first fluid pathway.

BRIEF DESCRIPTION OF THE DRAWINGS

Further characteristics and advantages of the device according to the invention will become clearer with the following detailed description of an embodiment of the invention, made with reference to the attached drawings, provided purely for illustrative and not limiting purposes, in which:

FIG. 3 is a perspective view of a piston of the shock absorber of FIG. 1;

FIG. 4 is a longitudinal section view of the shock absorber of FIG. 1 in a rest position;

FIG. 5 is a detailed view of a valve of the shock absorber in the position of FIG. 4;

FIG. 6 is a longitudinal section view of the shock absorber of FIG. 1 in a first work step;

FIG. 7 is a detailed view of the valve of the shock absorber in the step of FIG. 6;

FIG. 8 is a longitudinal section view of the shock absorber of FIG. 1 in a second work step;

FIG. 9 is a detailed view of the valve of the shock absorber in the step of FIG. 8;

FIG. 10 is a longitudinal section view of the shock absorber of FIG. 1 in an end stop position:

FIG. 11 is a detailed view of the valve of the shock absorber in the position of FIG. 11;

FIG. 12 is a longitudinal section view of the shock absorber of FIG. 1 in a return step;

FIG. 13 is a detailed view of the valve of the shock absorber in the step of FIG. 12;

FIGS. 24 to 26 are views, respectively in perspective, exploded and in section, of an obturating element of the valve of the piston according to a variant of the invention.

DETAILED DESCRIPTION OF THE INVENTION

Figure 1:
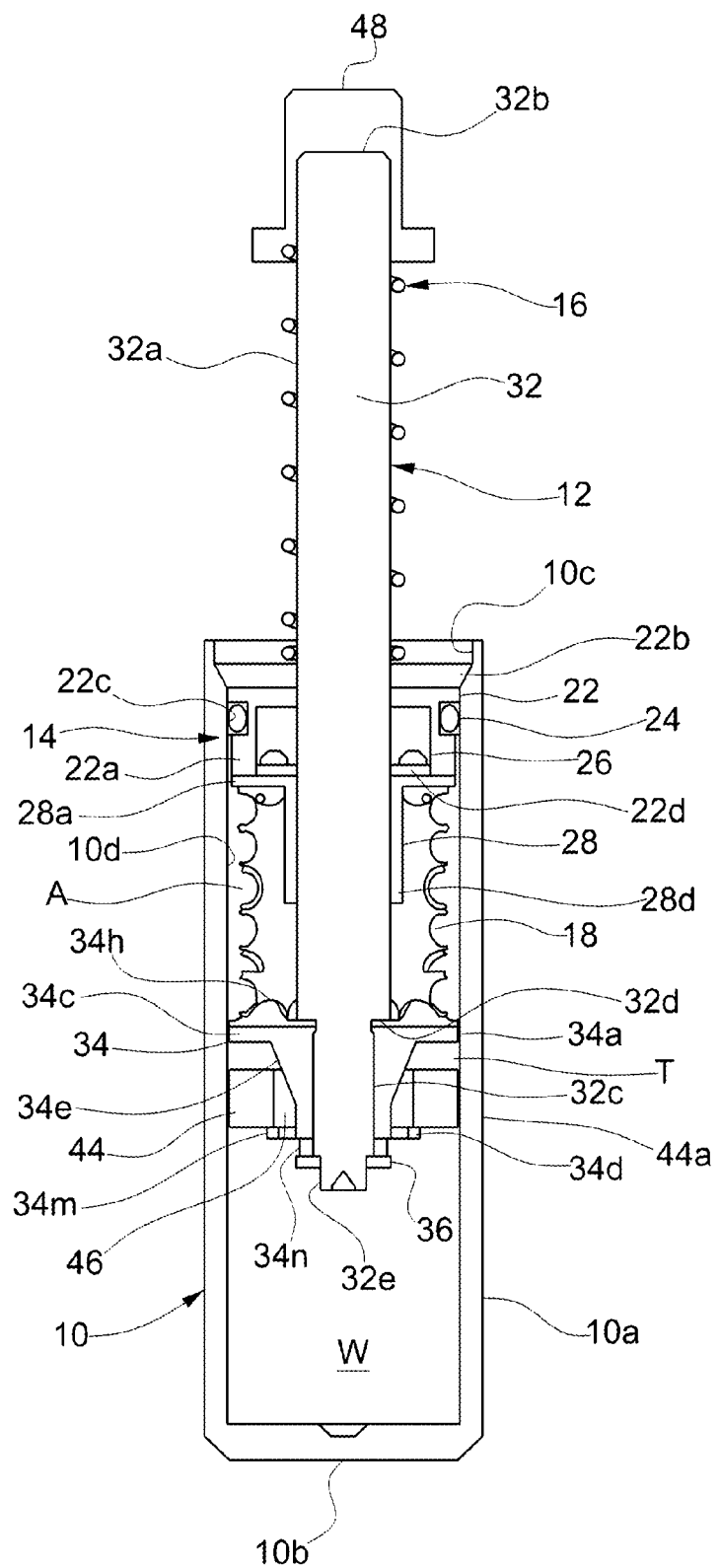
FIG. 1 is a longitudinal section view of a linear shock absorber according to the invention.
Figure 2:
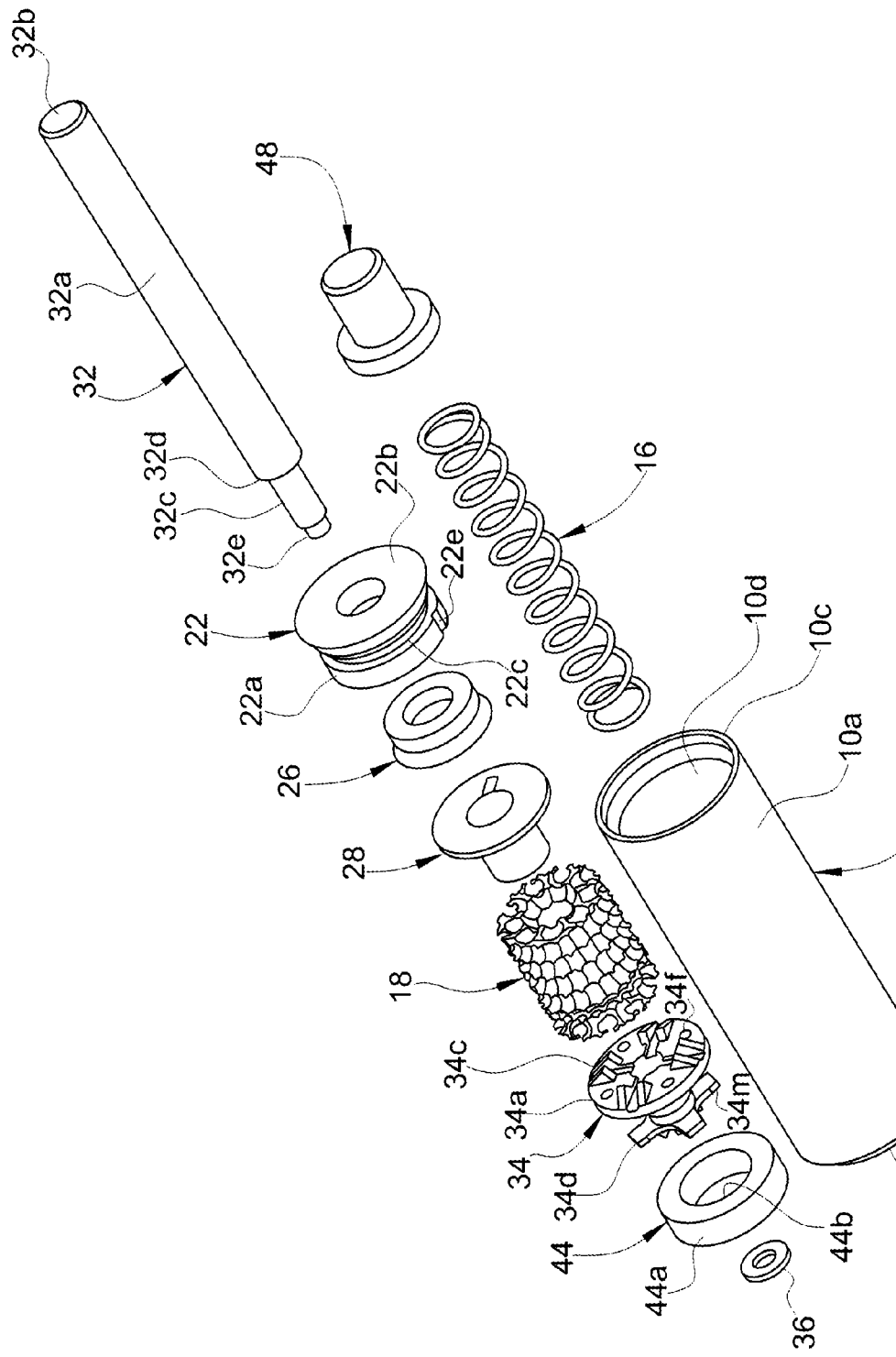
FIG. 2 is an exploded view of the shock absorber of FIG. 1.
Figure 14:
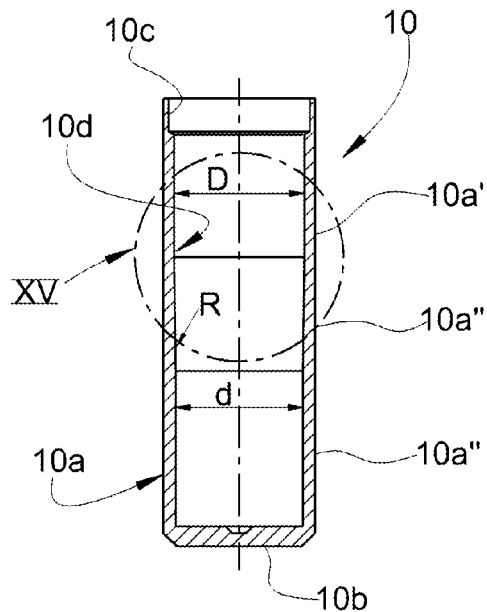
FIG. 14 is a section view of a component of the shock absorber of FIG. 1.
Figure 15:
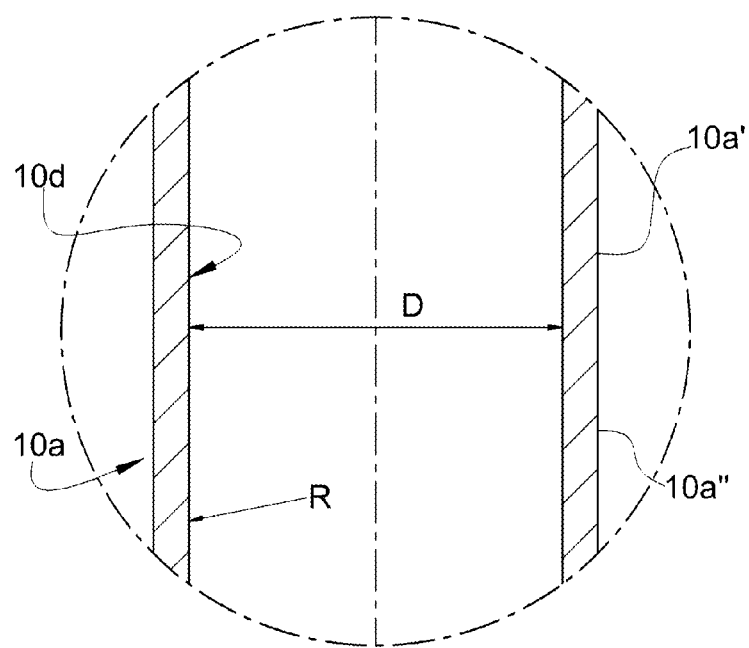
FIG. 15 is an enlarged view of a part of the component of FIG. 14.

With reference to FIGS. 1 and 2, a shock absorber according to the invention comprises a tubular housing 10, a piston assembly 12, a bearing assembly 14, a return spring 16, and a compensating element 18.

The tubular housing 10 comprises a main tubular housing portion 10a and a rear end wall portion 10b at the rear end of the housing. In the present description, the terms "front" and "rear" are meant in the longitudinal direction of the shock absorber, and are used with reference to the end of the shock absorber in which the stem of the piston is inserted.

The main tubular housing portion 10a has a collar portion 10c at its front end, having a lower wall thickness than the wall thickness of the adjacent part of the tubular housing portion 10a. The main tubular housing portion 10a defines a cavity 10d, which preferably has a variable diameter along the longitudinal direction of the shock absorber, as will be described in greater detail hereafter with reference to FIGS. 14 to 20.

The bearing assembly 14, in the illustrated example, comprises a support/cover element 22, an o-ring 24 (only visible in FIG. 1), a lip seal 26, and a spacer element 28. The constitution of such a bearing assembly is not however essential for the purposes of the invention.

The support element 22 comprises a main body portion 22a sized to insert into the cavity 10d of the tubular housing 10 near to the front end of the tubular housing, a frusto-conical front mounting portion 22b sized to be positioned in the cavity of the tubular housing 10 near to the collar portion 10c, where the thickness of the wall of the tubular housing has a variation, a groove 22c for receiving the o-ring 24, and a rear cavity 22d formed in the main body portion 22a and suitable for receiving the lip seal 26. On the outer surface of the main body portion 22a of the support element 22 there is a longitudinal groove 22e, suitable for allowing the air present inside the housing 10 to be discharged during the assembly of the support element 22 on the housing 10.

The bearing assembly 14 has a central passage to allow the stem of the piston to extend out to the outside; the seal at such a passage is ensured by the lip seal 26.

The front mounting portion 22b of the support element 22 is fixed to the tubular housing 10 near to the collar portion 22c, through folding of the collar portion itself (such folding is not represented). The method of closing the tubular housing 10 is not however essential for the purposes of the invention.

The spacer element 28 comprises a flanged portion 28a and a collar portion 28b extending centrally from the flanged portion 28a. The spacer element 28 is mounted so as to be able to freely slide on the stem of the piston assembly 12.

The piston assembly 12 comprises a stem 32, a piston 34, and a piston holding element 36.

The stem 32 comprises a main body portion 32a defining a front end 32b, a piston mounting portion 32c with reduced diameter near to the rear end of the stem and joined to the main body portion 32a through an annular shoulder portion 32d, and a further portion with reduced diameter 32e, at the rear end of the stem, for fixing the holding element piston 36 through upsetting.

Also with reference to FIGS. 3 and 5, the piston 34 is substantially bushing shaped and has a maximum outer diameter 34a sized to slidably insert inside the cavity 10d of the tubular housing 10, and an inner cavity 34b having a greater diameter than the outer diameter of the valve portion 32c with reduced diameter of the stem 32, so as to define an annular passage 42 between them, visible in FIG. 5. In FIG. 5 the pair of dotted and dashed vertical lines represents the diametral extension of the valve portion 32c with reduced diameter of the stem 32.

The piston 34 comprises a flange end portion 34c at its front end, a stop end portion 34d at its rear end, and a frusto-conical intermediate portion 34e that connects the end portions 34c and 34d to one another. The flange end portion 34c defines the outer diameter 34a of the piston 34, and a plurality of through holes 34f is formed through it. A plurality of radiately arranged grooves 34g is formed on the front side of the flange end portion 34c; each of such grooves 34g is optionally arranged between a respective pair of spacing projections 34h projecting from the front side of the flange end portion 34c. The stop end portion 34d comprises a hub portion 34i, from which a plurality of radial projections 34m extends radially. On the rear side of the stop end portion 34d there is a collar portion 34n arranged coaxially with the inner cavity 34b of the piston 34. Such a collar portion 34n is interrupted in many points by radial recesses 34p. The frusto-conical intermediate portion 34e is arranged so as to taper from the flange end portion 34c towards the stop end portion 34d.

The piston 34 is axially anchored to the piston mounting portion 32c with reduced diameter of the stem 32 through the holding element 36, which locks it against the annular shoulder portion 32d of the stem 32.

Around the piston 34, the frusto-conical intermediate portion 34e, there is a ring seal 44 made from deformable material. Such a ring seal preferably has a rectangular or square section, and it has an outer diameter 44a sized to slidably insert inside the cavity 10d of the tubular housing 10, and an inner cavity 44b having a diameter substantially equal to the maximum outer diameter of the frusto-conical intermediate portion 34e of the piston 34. Between the inner diameter 44b of the ring seal 44 and the outer diameter of the frusto-conical intermediate portion 34e of the piston 34 an annular passage 46 is therefore defined. The ring seal 44 is free to move, with respect to the piston 34, along a longitudinal section defined by the flange end portion 34c on one side, and on the other side by the radial projections 34m of the stop portion 34d.

The piston 34 axially divides the inner cavity 10d of the tubular housing 10 into a working chamber W, arranged between the piston 34 and the end wall 10b of the tubular housing 10, and into an accumulator chamber A, arranged between the piston 34 and the bearing assembly 14. Such chambers are filled with a viscous fluid, for example silicone oil, which during the operation of the shock absorber passes from one chamber to the other in the way that will be explained hereafter. When the ring seal 44 is not in contact with the flanged portion 34c of the piston, between them a transition chamber T of variable volume is defined, which on one side is connected to the accumulator chamber A through the holes 34f of the flanged portion 34c of the piston, and on the other side is connected to the working chamber W through the annular passage 46, with variable section, between the inner diameter 44b of the ring seal 44 and the outer diameter of the frusto-conical intermediate portion 34e of the piston 34.

The ring seal 44 interacts with the rear surface 34q of the flange end portion 34c of the piston forming a valve, the obturating element of which consists of the ring seal 44 and the seat of which consists of the rear surface 34q, in which the holes 34f for the passage of the fluid are formed. Thanks to such a valve configuration, the fluid pathway comprising the annular passage 46 is able to selectively assume an open configuration, in which such a fluid pathway establishes a fluid communication between the working chamber W and the accumulator chamber A, and a closed configuration, in which such a fluid pathway is blocked.

The return spring 16 is a helical spring, the front end of which pushes on a push rod 48, which is mounted on the front end 32b of the stem 32, and the rear end of which is fixed to the support element/cover 22, so as to normally bias the piston assembly 12 in the direction of release of the shock absorber. The maximum release, or rest, position of the piston assembly 12 is illustrated in FIG. 4, and it is determined by the length of the collar portion 28b of the spacer element 28, against which the piston 34 abuts in the aforementioned maximum release position.

The compensating element 18 is arranged inside the accumulator chamber A, and is fitted onto the collar portion 28b of the spacer element 28.

Such an element is substantially annular and is made from foam material, for example silicone sponge. Alternatively, it can consist of an elastic diaphragm. The compensating element 18 squashes and expands in a known manner during the movements of the piston assembly 12 to compensate for the variations in volume of the working chamber that occur during the course of the aforementioned movements.

As stated earlier, FIG. 4 illustrates the shock absorber according to the invention in the maximum release position, or rest position. FIG. 5 illustrates the valve group formed by piston 34 and ring seal 44 in such a rest position. The viscous fluid is entirely (or almost) in the working chamber W, and the compensating element 18 is compressed. The spacing projections 34h projecting from the front side of the flange end portion 34c of the piston engage the free end of the compensating element 18 to prevent it from being able to block the grooves 34g on the front side of the flange end portion 34c. The working chamber is therefore in fluid communication with the accumulator chamber A through two distinct paths. The first path, with greater fluid resistance, is formed by the radial recesses 34p on the collar portion 34n of the piston, by the annular passage 42 defined between the inner diameter 34b of the piston and the outer diameter of the piston mounting portion 32c with reduced diameter of the stem 32, and by the radially arranged grooves 34g on the front side of the flange end portion 34c of the piston (alternatively, the first path with greater fluid resistance can be formed in other areas of the shock absorber, for example through the body of the piston 34). The second path, in completely open conditions having a lower fluid resistance, is formed by the spaces between the radial projections 34m of the stop end portion 34d of the piston, by the annular passage 46 between the inner diameter 44b of the ring seal 44 and the outer diameter of the frusto-conical intermediate portion 34e of the piston 34, by the transition chamber T, and by the through holes 34f formed through the flanged portion 34c of the piston.

By applying a heavy load M onto the push rod 48 of the stem 32, as illustrated in FIG. 6, the piston 34 suddenly drives down inside the shock absorber (arrows $M_1$). The fluid in the working chamber W tends to rise (arrows $L_1$) and the ring seal 44 is taken against the flanged portion 34c of the piston, tending to interrupt the passage of fluid through the path with less fluid resistance. Due to the high pressure, greater than a predetermined level $p_0$ (depending, amongst other things, on the hardness of the material of the ring seal 44), which is created due to the load M, the ring seal 44 is nevertheless squashed radially against the wall of the tubular housing 10, as schematically illustrated in FIG. 7. Such squashing is promoted by the tapering of the frusto-conical intermediate portion 34e of the piston 34. With this the perviousness of the fluid pathway with less fluid resistance is maintained, and therefore the viscous fluid passes from the working chamber W to the accumulator chamber A through both the communication paths indicated above. In this way, the movement induced by the application of the high load M is only partially damped, but avoiding the production of vibrations that would otherwise have been produced in the case in which the ring seal 44 was not deformable, due to the pressure of the fluid.

By reducing the load applied to a value m, less than M, as illustrated in FIG. 8, the piston 34 drops slowly inside the shock absorber (arrows $M_2$). The fluid in the working chamber W tends to rise (arrows $L_2$) and the ring seal 44, through the pressure thus generated in the working chamber W, is kept against the flanged portion 34c of the piston. With the reduction of the pressure below the reference level $p_0$ the ring seal 44 recovers its original shape, as illustrated in FIG. 9. With this the passage sections of the through holes 34f on the flanged portion 34c of the piston are blocked by the seal 44, and therefore the fluid pathway with less fluid resistance is blocked, and the passage of the viscous fluid from the working chamber W to the accumulator chamber A takes place exclusively through the path with greater fluid resistance. In this way, the movement induced by the application of the reduced load m is completely damped. Such a movement, and the corresponding passage of fluid, are blocked once the point of maximum squashing of the shock absorber is reached, as illustrated in FIGS. 10 and 11. In the illustrated example the point of maximum squashing is reached when the rear end of the stem 32 goes into abutment against the rear end wall portion 10b of the tubular housing 10.

By removing the external load, as illustrated in FIG. 12, the stem 32 is pushed towards the rest position by means of the return spring 16, taking the piston 34 with it (arrows $M_R$). Through the pressure thus generated in the accumulator chamber A the ring seal 44 is taken against the stop end portion 34d of the piston, as illustrated in FIG. 11. With this the path with less fluid resistance reopens, and the passage of the viscous fluid from the accumulator chamber A to the working chamber W takes place through both fluid communication pathways (arrows $L_R$). In this way, the return movement of the piston 34 is damped in practically insignificant manner.

In the example of operation described above we refer to a situation in which a high load is initially applied, which is then reduced. According to the application for which the shock absorber is intended, such a high load can nevertheless be absent, and therefore the shock absorber works in practically constant load conditions, in the configuration illustrated in FIGS. 8 and 9. Moreover, the shock absorber described above is able to work with other configurations of load variation (for example load initially low, then high, and finally low again), which can occur according to the type of application for which the shock absorber is intended.

Preferably, in order to modulate the resistance force provided by the shock absorber during the work step, it is foreseen for the main tubular housing portion 10a of the housing 10 to define a cavity 10d having a variable diameter along the longitudinal direction of the shock absorber, as illustrated in FIGS. 14 to 20. In particular, such a main portion 10a comprises a front segment 10a', in which the cavity 10d has a constant maximum diameter value D, an intermediate transitional segment 10a'', along which the diameter of the cavity 10d varies from D to a minimum value d, and a rear segment 10a''', in which the cavity 10d has the constant diameter value d. At the intermediate segment 10a'' there is therefore a narrowing R, in particular a flaring, towards the rear end of the tubular housing 10. The outer diameter of the ring seal 44 is smaller than the value D, and it is substantially equal to or slightly greater than the value d. The outer diameter of the flanged portion 34c of the piston is smaller than the outer diameter of the ring seal 44, and it is equal to or slightly smaller than the value d. The modulation of the resistance force provided by the shock absorber during the work step is thus obtained by modulating the widening of the ring seal 44, and consequently the opening of the holes 34f of the flanged portion 34c of the piston, thanks to the fact that the wall of the cavity 10d provides a maximum limit, of variable width along the shock absorber, for the radial widening of the ring seal.

Figure 16:
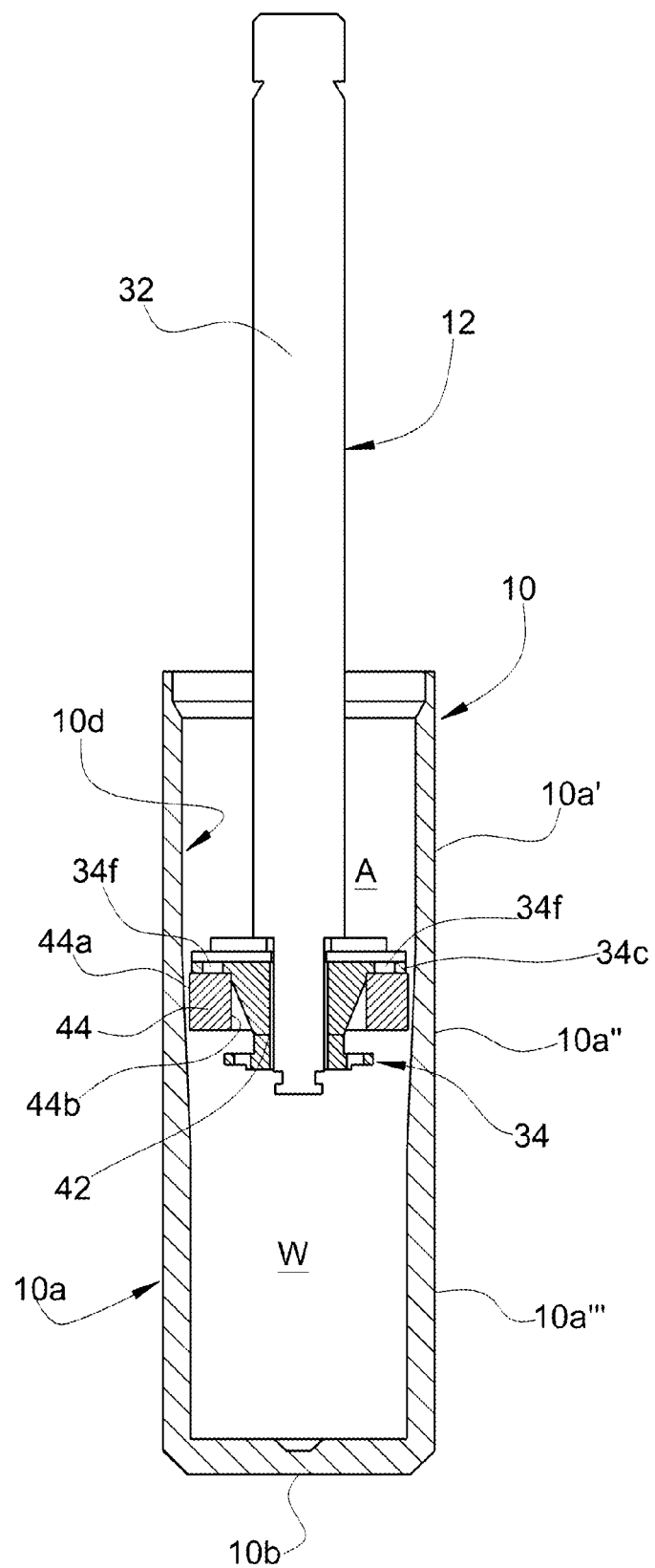
FIGS. 16 to 20 are longitudinal section views of the valve of the shock absorber in various successive positions of the piston during the work step of the shock absorber.

With reference to FIG. 16, the shock absorber is illustrated in rest position. For the sake of simplicity just the tubular housing 10 and the piston assembly 12 are shown. As can be seen, the piston assembly is arranged at a front end of the transitional segment 10a'' of the tubular housing 10; between the flanged portion 34c of the piston and the inner surface of the transitional segment 10a'' there is a certain clearance. There can also be a certain space between the ring seal 44 and the inner surface of the transitional segment 10a''.

Figure 17:
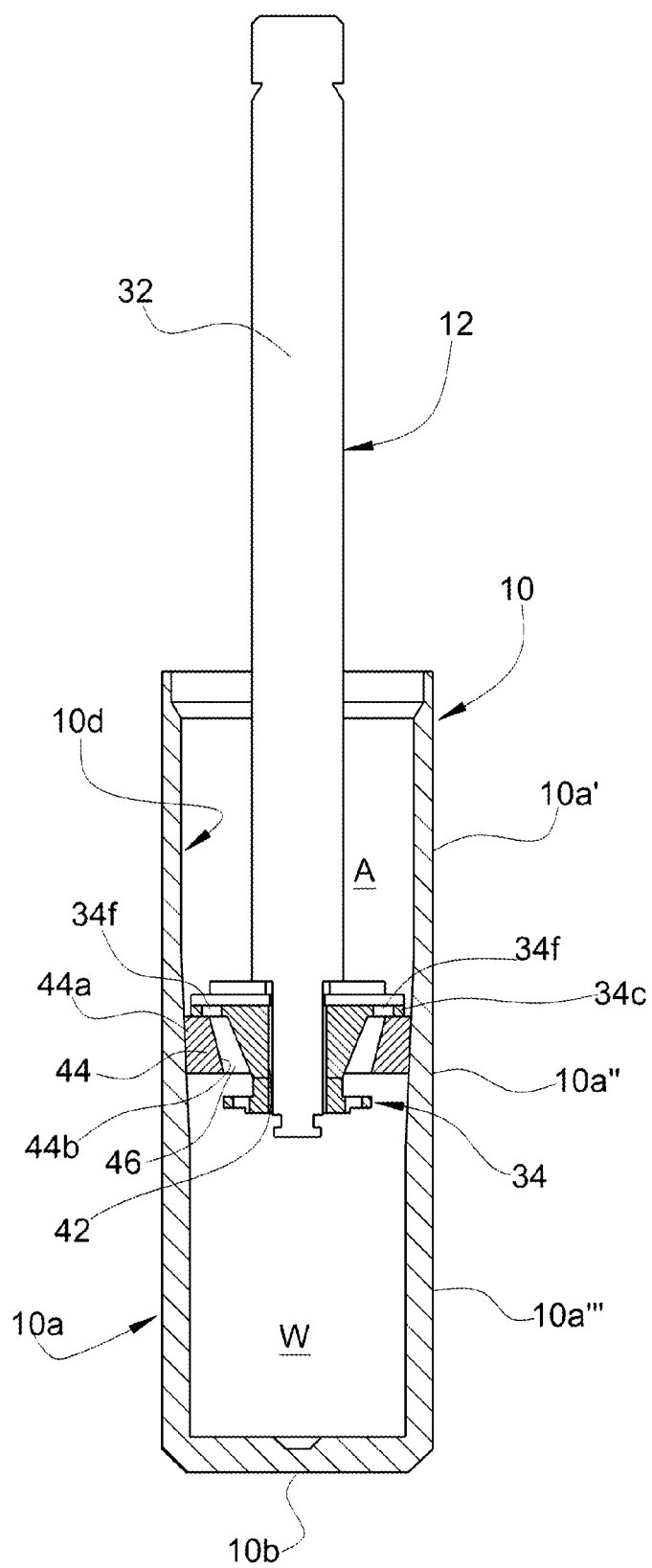

By applying a high load M on the stem 32 the piston assembly 12 lowers in the shock absorber; inside the working chamber W a pressure $p_0$ is produced such as to cause the deformation of the ring seal 44, which widens radially until it makes contact against the wall of the tubular housing 10, as illustrated in FIG. 17. Thanks to such a deformation, the holes 34f of the flanged portion 34c of the piston are open to the maximum extent. In this condition, the passage of viscous fluid from the working chamber W to the accumulator chamber A occurs both through the first fluid pathway and through the second fluid pathway (prevalently through the latter).

Figure 18:
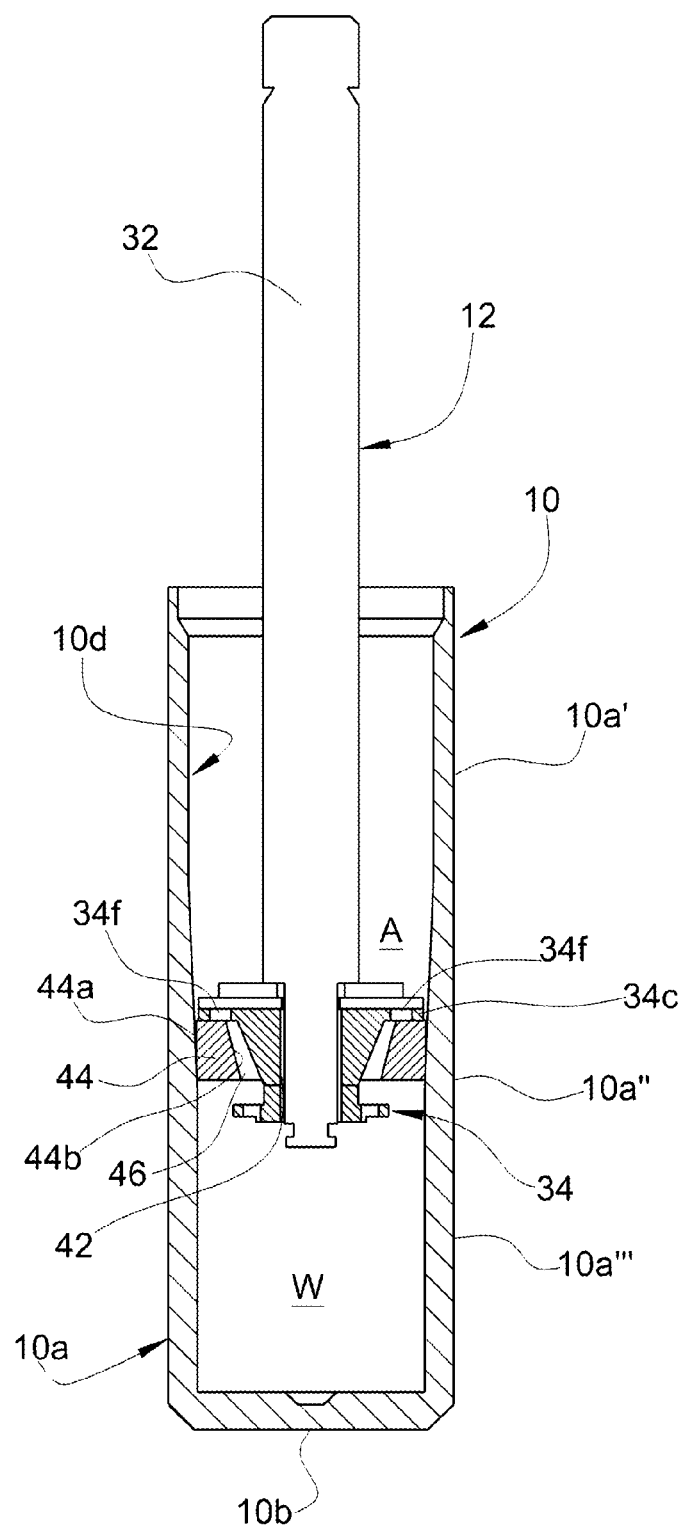
Figure 19:
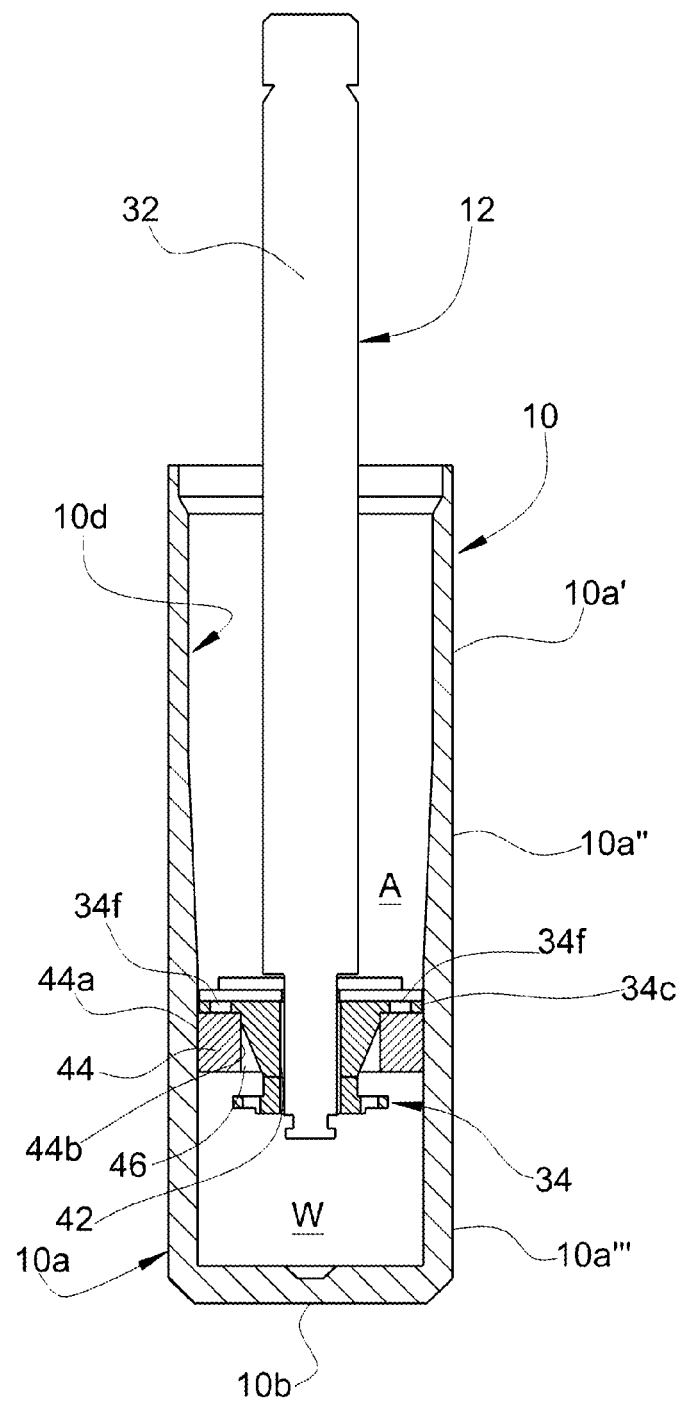
Figure 20:
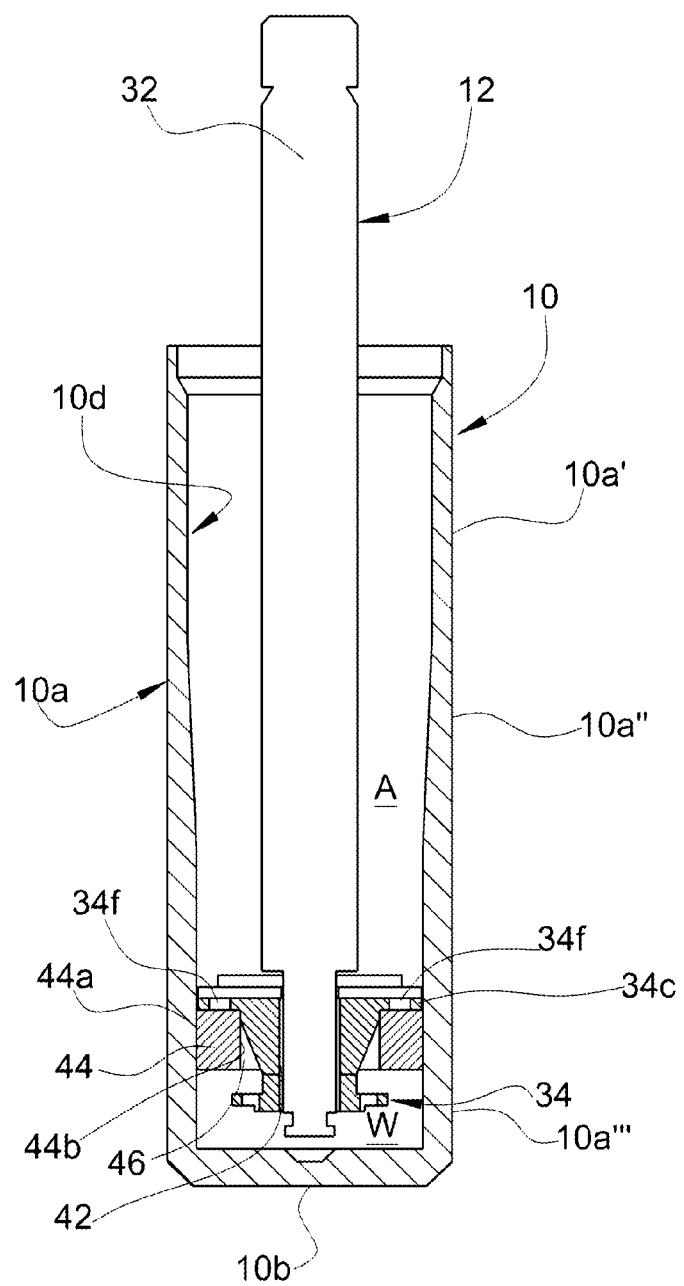

By continuing to apply the load the piston assembly 12 continues to lower; thanks to the fact that the diameter of the cavity 10d narrows, the ring seal 44 is compressed radially by the wall of the tubular housing 10, reducing the opening of the holes 34f, and thus increasing the resistance force of the shock absorber. The clearance between the flanged portion 34c of the piston and the inner surface of the transitional segment 10a'' also reduces (FIG. 18).

When the piston assembly 12 reaches the rear segment 10a''' (FIG. 19) the reduced diameter of the cavity 10d constricts the ring seal 44 to block the holes 34f. From this point up to the end stop position (FIG. 20) the passage of viscous fluid from the working chamber W to the accumulator chamber A takes place just through the first fluid pathway; consequently, the resistance force exerted by the shock absorber is at its maximum.

By varying the degree of conicity of the flaring R foreseen on the transitional segment 10a'', and the length of the latter (as well as, of course, the hardness of the ring seal 44), it is possible to obtain different damping modes able to be used for different situations.

Figure 21:
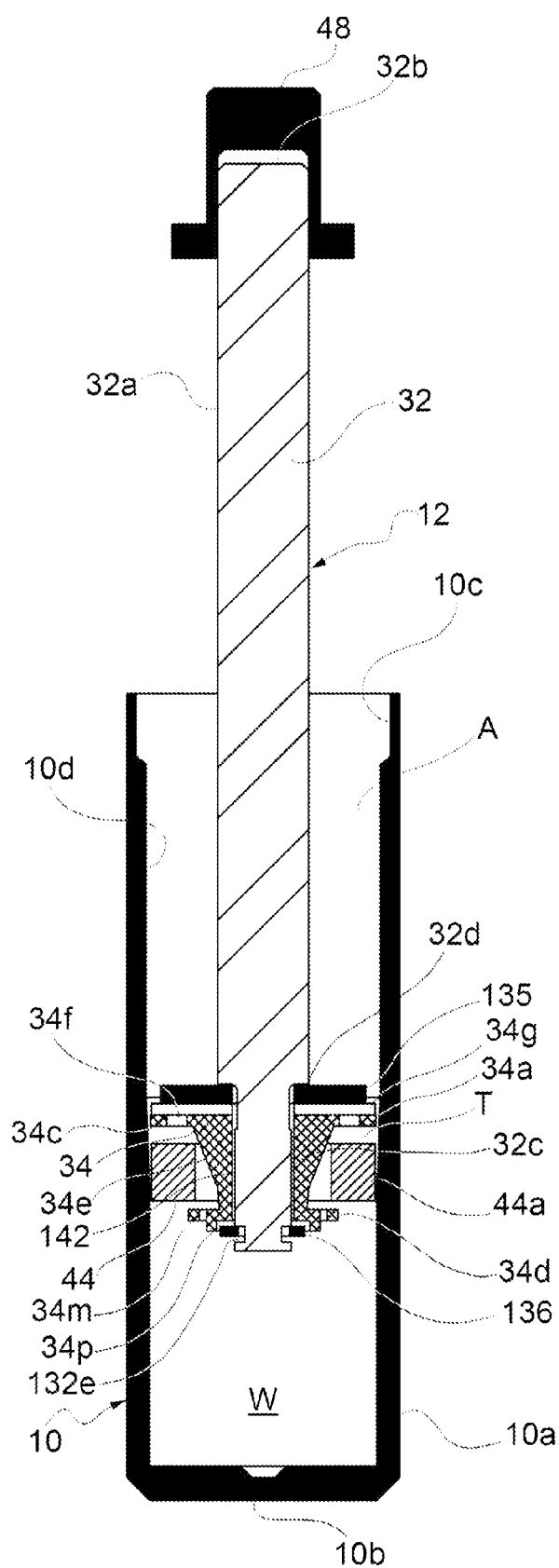
FIG. 21 is a longitudinal section view of a second embodiment of a linear shock absorber, in incomplete form.
Figure 23:
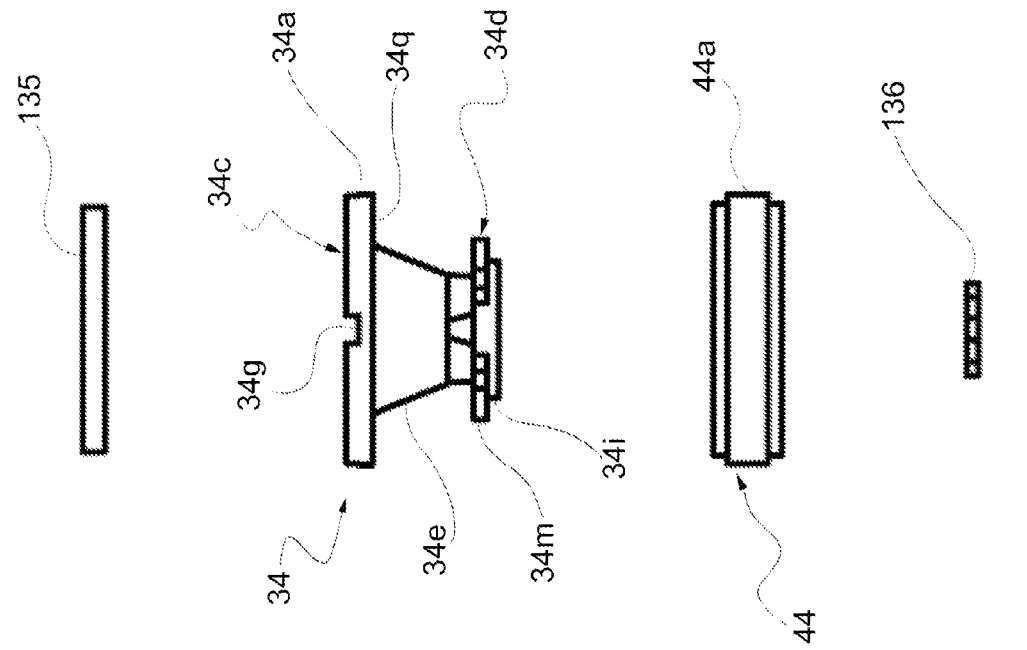
FIGS. 22 and 23 are exploded views, respectively in perspective and in side elevation, of a piston provided with the valve of the shock absorber of FIG. 21.
Figure 22:
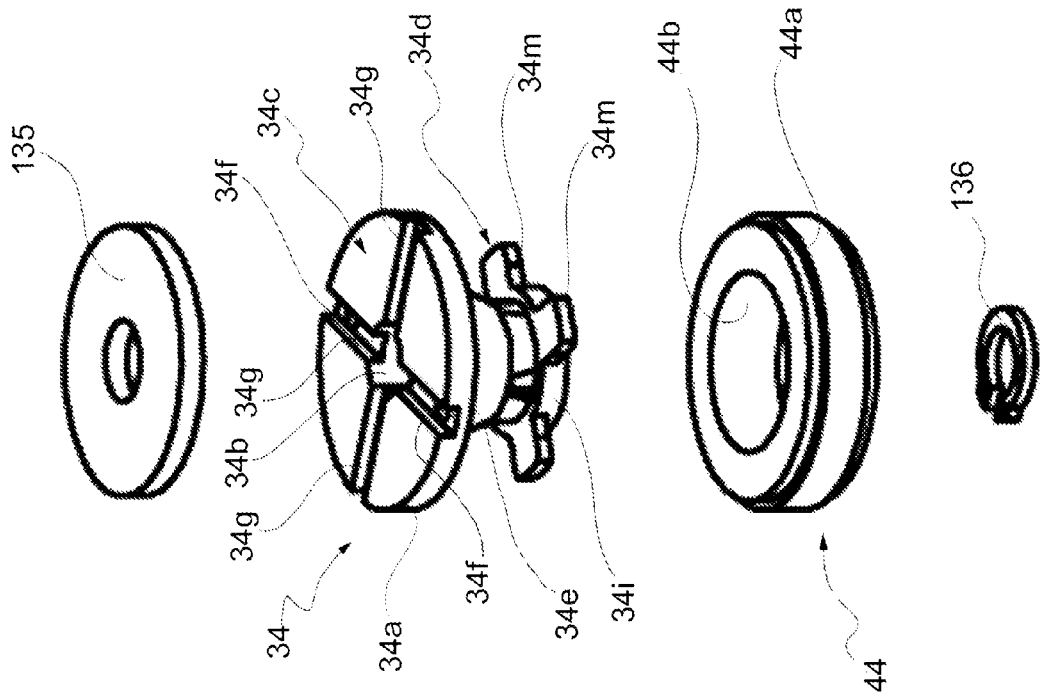

With reference to FIGS. 21 to 23, a second embodiment of the shock absorber according to the invention is illustrated. In such figures, the elements corresponding to those of the previous embodiment have been indicated with the same reference numerals, and they shall not be described any further, except for what is necessary to explain the specific characteristics of the second embodiment. For the sake of simplicity in FIG. 21 just the tubular housing 10 and the piston assembly 12 are shown. It should be understood that the shock absorber of FIG. 21 is also equipped with a bearing assembly, a return spring and a compensating element, possibly analogous to those of the previous embodiment.

The shock absorber of FIG. 21 differs from that of FIG. 1 for the structure of the piston and for the type of assembly of such a piston to the stem. Regarding this, the stem 32 at its rear end comprises a throat 132e formed adjacent to the piston mounting portion 32c with reduced diameter. A piston holding element 136, consisting of an elastic check ring, is mounted on the throat 132e to axially hold the piston 34 to the piston mounting portion 32c with reduced diameter of the stem 32.

Also with reference to FIGS. 22 and 23, the piston 34 is shaped substantially like a bushing and has a maximum outer diameter 34a sized to slidingly insert inside the cavity 10d of the tubular housing 10, and an inner cavity 34b having a diameter sized to allow the assembly of the piston on the mounting portion 32c with reduced diameter of the stem 32. Such an inner cavity can have a diameter such as to define an annular passage with the mounting portion 32c, like in FIG. 5; alternatively, there can be longitudinal grooves 142, formed on the surface of the inner cavity 34b and/or on the surface of the mounting portion 32c with reduced diameter of the stem 32, such as to define corresponding fluid passages.

The piston 34 comprises a flange end portion 34c at its front end, a stop end portion 34d at its rear end, and a frusto-conical intermediate portion 34e that connects together the end portions 34c and 34d. The flange end portion 34c defines the outer diameter 34a of the piston 34, and through it a plurality of through holes 34f is formed. On the front side of the flange end portion 34c there is a plurality of radiately arranged grooves 34g; a corresponding through hole 34f opens into each of such grooves 34g. The stop end portion 34d comprises a hub portion 34i, from which a plurality of radial projections 34m extends radially. On the rear side of the stop end portion 34d there are recesses 34p, which allow the passages 142 to stay in fluid communication with the working chamber W.

The piston 34 is axially anchored to the piston mounting portion 32c of reduced diameter of the stem 32 through the holding element 136, which locks it against the annular shoulder portion 32d of the stem 32. Between such an annular shoulder portion 32d and the piston 34 there is a reinforcement washer 135.

Similarly to the previous embodiment, around the piston 34, at the frusto-conical intermediate portion 34e, there is an obturating member 44. The operation of the shock absorber of FIGS. 21 to 23 is totally analogous to that of the previous embodiment, and reference is to be made to its description in order to understand it.

Of course, the characteristics described with reference to an embodiment can be combined, provided that they are compatible, with the characteristics described with reference to the other embodiment.

FIGS. 24 to 26 illustrate a variant of the obturating member, indicated with 144. Such a variant can be applied to all of the shock absorbers described earlier, with an analogous arrangement to that of the obturating member indicated with 44. Such an obturating member is annular in shape, with an approximately rectangular or square section, and it has an outer diameter 144a sized to slidingly insert inside the cavity 10d of the tubular housing 10, and an inner cavity 144b having a diameter substantially equal to the maximum outer diameter of the frusto-conical intermediate portion 34e of the piston 34.

Unlike the previous embodiment, the obturating member 144 is formed by two distinct elements coupled together so as to move as a unit inside the shock absorber. In particular, the shutter member 144 comprises an annular core 145 made from deformable material, analogous to that which makes up the obturating member 44 described earlier, and an outer annular liner 146 made from rigid material. The terms "deformable" and "rigid" refer to the whether or not it is able to deform due to the pressures present inside the shock absorber. The inner cavity of the annular core 145 defines the inner cavity 144b of the shutter member 144. The outer annular liner 146, inside which the annular core 145 is received, is shaped like a cup with a side wall 146a and a bottom wall 146b, at the centre of which a hole 146c is formed aligned with the inner cavity of the annular core. The outer annular liner 146 also has a radial interruption 146d that interrupts its annular continuity, so that the outer annular liner 146 forms an open ring.

The operation of the obturating member 144 is analogous to that of the obturating member 44 described earlier. In mounted condition the outer annular liner 146 adheres against the wall of the inner cavity 10d of the housing 10 of the shock absorber. In the case in which such an inner cavity 10d is provided with conicity, the outer annular liner 146 during the movement of the shock absorber is compressed modifying the width of the radial interruption 146d (consequently modifying the resistance to the passage of the fluid). In any case, such an interruption 146d is sized so as to have a permanent passage for the fluid, also in the case of compression of the outer annular liner 146. In the case in which it is foreseen for there to be the permanent passage provided by the interruption 146d, it is no longer necessary to form one or more permanent passages between the stem 32 and the piston 34, like those indicated with 42 and 142 in the embodiments described earlier. Otherwise the operation of the shock absorber equipped with the composite obturating member 144 is analogous to that of the shock absorber equipped with the obturating member in a single piece 44. By applying a load on the stem 32, the annular core 145 of the obturating member 144 goes to block the passage sections of the through holes 34f on the flanged portion 34c of the piston. With respect to the obturating member 44 described earlier, the deform-ability threshold of the annular core 145 can be set at a lower pressure level $p_o$, since for the same overall dimensions of the shutter the radial thickness of deformable material is less.

With the present invention it is possible to make miniaturised shock absorbers, of a length of a few centimeters, capable of operating also in the presence of high external loads. In general, the elements that make up the shock absorber can be made with plastic materials (with the exception of the spring). Higher performance can be obtained by making the housing 10, the stem 32, the push rod 48 and possibly the reinforcement washer 135 with metallic materials.

In a variant of the invention (not illustrated), the stem can be configured so as to be able to carry out a rotation movement around its own longitudinal axis, and be equipped with a cam linkage mechanism to transfer the rotary motion of the stem into translation motion of the piston.

The invention claimed is:

1. A shock absorber comprising:
a tubular housing having a front end and a rear end;
a bearing assembly sealingly mounted on the front end of the tubular housing;
a piston assembly comprising a piston mounted for reciprocal sliding movement in the tubular housing, said piston defining within the tubular housing a working chamber (W) and an accumulator chamber (A) disposed on the rear side and on the front side of the piston, respectively, and a stem connected to the piston and extending out of the front end of the tubular housing through the bearing assembly;
a first fluid pathway and a second fluid pathway parallel disposed for connecting the working chamber (W) to the accumulator chamber (A), wherein said first fluid pathway establishes permanent fluid communication between the working chamber and the accumulator chamber; and
a valve for selectively establishing fluid communication between the working chamber (W) and the accumulator chamber (A);
wherein
said valve comprise a ring-shaped obturating element arranged around the piston and slidable along an axial length of the piston; and
said second fluid pathway comprises a first pathway section formed through said piston and a second pathway section formed between the piston and the obturating element so that said second fluid pathway is able to selectively assume an open configuration, in which said second fluid pathway establishes a fluid communication between the working chamber (W) and the accumulator chamber (A), and a closed configuration, in which said second fluid pathway is blocked, said second fluid pathway having in the open configuration a lower fluid resistance than the first fluid pathway.

2. A shock absorber according to claim 1, wherein said obturating element is at least partially of sufficiently deformable material so that, when the second fluid pathway is in closed configuration and pressure in the working chamber (W) is greater than a predetermined level $p_0$, said obturating element is deformed against the wall of said tubular housing so as to open said first pathway section of the second fluid pathway.

3. A shock absorber according to claim 2, wherein said tubular housing defines a cavity whose diameter is varying along the longitudinal direction of the shock absorber, said tubular housing comprising a transitional segment along which the diameter of said cavity is varying from a maximum value (D) to a minimum value (d), the transitional segment of the tubular housing being adapted to modulate the opening of said first pathway section of the second fluid pathway during movement of the piston assembly.

4. A shock absorber according to claim 3, wherein said transitional segment of the tubular housing has a flare tapering toward the rear end of the tubular housing.

5. A shock absorber according to claim 4, wherein the outer diameter of said obturating element is smaller than the maximum diameter (D) of the cavity, and is equal to or greater than the minimum diameter (d)—as previously instructed in the quayle action of the cavity.

6. A shock absorber according to claim 3, wherein the outer diameter of said obturating element is smaller than the maximum diameter (D) of the cavity, and is equal to or greater than the minimum diameter (d)—as previously instructed in the quayle action of the cavity.

7. A shock absorber according to claim 1, wherein in said closed configuration the obturating element engages a valve seat formed on said piston in such a way as to close said first pathway section of the second fluid pathway, while in said open configuration the obturating element is moved away from said valve seat.

8. A shock absorber according to claim 7, wherein the piston comprises a flange end portion at its front end defining the maximum outer diameter of the piston, a stop end portion at the rear end of the piston, and an intermediate portion connecting said end portions of the piston to one another, wherein said obturating element is slidable between said flange end portion and said stop end portion, said valve seat being formed on a rear surface of the flange end portion, and wherein said first pathway section of the second fluid pathway is formed by a plurality of through-holes formed through said flange end portion.

9. A shock absorber according to claim 8, wherein said piston is mounted between an annular shoulder portion of the stem and a holding element mounted on the stem, wherein a plurality of radiately-arranged grooves is formed on the front side of the flange end portion of the piston, wherein at least one recess is formed on the rear side of the stop end portion, and wherein the first fluid pathway comprises a passage formed between the stem and the piston, said radiately-arranged grooves and said recess, which are on opposite sides connected to said passage.

10. A shock absorber according to claim 9, wherein a compensating element of foam material is arranged within the accumulator chamber (A), and wherein spacing projections are formed on the front side of the flange end portion of the piston near to each of the radiately-arranged grooves.

11. A shock absorber according to claim 1, wherein said obturating element is constituted by a ring seal.

12. A shock absorber according to claim 11, wherein the piston comprises a flange end portion at its front end defining the maximum outer diameter of the piston, a stop end portion at the rear end of the piston, and an intermediate portion connecting said end portions of the piston to one another, wherein said obturating element is slidable between said flange end portion and said stop end portion, said valve seat being formed on a rear surface of the flange end portion, and wherein said first pathway section of the second fluid pathway is formed by a plurality of through-holes formed through said flange end portion.

13. A shock absorber according to claim 1, wherein said obturating element comprises an annular core made from deformable material and an outer liner made from rigid material inside which said annular core is received, said outer liner being shaped like a cup with a side wall and a bottom wall, at the centre of which a hole is formed aligned with the inner cavity of the annular core.

14. A shock absorber according to claim 13, wherein said outer annular liner has a radial interruption that interrupts its annular continuity, so that said outer annular liner forms an open ring, and wherein said first fluid pathway that establishes a permanent fluid communication between the working chamber and the accumulator chamber is formed through said radial interruption.

15. A shock absorber according to claim 14, wherein the piston comprises a flange end portion at its front end defining the maximum outer diameter of the piston, a stop end portion at the rear end of the piston, and an intermediate portion connecting said end portions of the piston to one another, wherein said obturating element is slidable between said flange end portion and said stop end portion, said valve seat being formed on a rear surface of the flange end portion, and wherein said first pathway section of the second fluid pathway is formed by a plurality of through-holes formed through said flange end portion.

16. A shock absorber according to claim 13, wherein the piston comprises a flange end portion at its front end defining the maximum outer diameter of the piston, a stop end portion at the rear end of the piston, and an intermediate portion connecting said end portions of the piston to one another, wherein said obturating element is slidable between said flange end portion and said stop end portion, said valve seat being formed on a rear surface of the flange end portion, and wherein said first pathway section of the second fluid pathway is formed by a plurality of through-holes formed through said flange end portion.

* * * * *

UNITED STATES PATENT AND TRADEMARK OFFICE
CERTIFICATE OF CORRECTION

| | | |
|---|---|---|
| PATENT NO. | : 8,857,579 B2 | Page 1 of 1 |
| APPLICATION NO. | : 13/500299 | |
| DATED | : October 14, 2014 | |
| INVENTOR(S) | : Cultraro | |

It is certified that error appears in the above-identified patent and that said Letters Patent is hereby corrected as shown below:

Title Page Item (57), ABSTRACT, line 3, delete "34g 34h".

Signed and Sealed this
Seventeenth Day of February, 2015

Michelle K. Lee
*Deputy Director of the United States Patent and Trademark Office*